(12) United States Patent
Yano

(10) Patent No.: US 11,189,081 B2
(45) Date of Patent: Nov. 30, 2021

(54) IMAGE GENERATION APPARATUS, IMAGE GENERATION METHOD AND STORAGE MEDIUM

(71) Applicant: CANON KABUSHIKI KAISHA, Tokyo (JP)

(72) Inventor: Tomohiro Yano, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 62 days.

(21) Appl. No.: 16/815,434

(22) Filed: Mar. 11, 2020

(65) Prior Publication Data

US 2020/0312014 A1 Oct. 1, 2020

(30) Foreign Application Priority Data

Mar. 26, 2019 (JP) .............................. JP2019-058994

(51) Int. Cl.
*G06T 15/20* (2011.01)

(52) U.S. Cl.
CPC .......... *G06T 15/20* (2013.01); *G06T 2200/08* (2013.01)

(58) Field of Classification Search
CPC .............................. G06T 15/20; G06T 2200/08
See application file for complete search history.

(56) References Cited

U.S. PATENT DOCUMENTS

| 2009/0315978 | A1* | 12/2009 | Wurmlin | .................. G06T 7/20 348/43 |
| 2017/0256081 | A1* | 9/2017 | Ohki | ....................... G06T 11/60 |
| 2018/0061086 | A1* | 3/2018 | Yoshimura | ......... H04N 5/23229 |
| 2019/0236837 | A1* | 8/2019 | Li | ........................... G06T 11/60 |
| 2019/0238819 | A1* | 8/2019 | Furukawa | .............. H04N 13/00 |
| 2019/0311526 | A1* | 10/2019 | Sugio | .................. H04N 13/117 |

FOREIGN PATENT DOCUMENTS

JP        2017182695 A      10/2017

\* cited by examiner

*Primary Examiner* — Kee M Tung
*Assistant Examiner* — Khoa Vu
(74) *Attorney, Agent, or Firm* — Carter, DeLuca & Farrell LLP

(57) ABSTRACT

The image generation apparatus is an image generation apparatus having: a first acquisition unit configured to acquire three-dimensional shape data of a background; a second acquisition unit configured to acquire a two-dimensional map image; a third acquisition unit configured to acquire a first image and a second image; and a generation unit configured to generate a first color information image indicating color information on an element configuring the three-dimensional shape data of the background and generate a second color information image indicating color information on an element configuring the three-dimensional shape data of the background.

13 Claims, 16 Drawing Sheets

IMAGE GENERATION APPARATUS, IMAGE GENERATION METHOD AND STORAGE MEDIUM

BACKGROUND

Field

The present disclosure relates to a technique for generating a virtual viewpoint image.

Description of the Related Art

In recent years, a technique has been attracting attention, which generates a virtual viewpoint image from an arbitrary viewpoint, not only an image at a camera installation position, by installing a plurality of cameras at different positions, performing synchronous image capturing from a plurality of viewpoints, and using a multi-viewpoint image obtained by the image capturing. Generation of a virtual viewpoint image based on the multi-viewpoint image is implemented by putting together the images captured by a plurality of cameras in an image processing unit, such as a server, and performing processing, such as foreground/background separation, generation of three-dimensional shape data, generation of a background, and rendering.

Here, in generation of a background in a virtual viewpoint image, generally, coloring of three-dimensional shape data of a background, such as a stadium, which is prepared in advance, and rendering are performed. As the coloring method, a method is known in which a homography is calculated by using a correspondence relationship between the mesh configuring three-dimensional shape data and the captured image of the camera, the captured image is transformed by projective transformation, and a texture is associated with the mesh configuring the three-dimensional shape data. Japanese Patent Laid-Open No. 2017-182695 has disclosed a technique to associate a texture with the three-dimensional shape data by creating a panorama image by specifying positions on a three-dimensional space, which correspond to a plurality of images captured with a narrow viewing angle, by using an image captured with a wide viewing angle and performing image transformation by the projective transformation.

However, in a case where a texture is associated with three-dimensional shape data based on an image for which projective transformation has been performed, it is necessary to perform projective transformation for each camera image in accordance with the number of elements configuring the three-dimensional shape data, and therefore, as the three-dimensional shape data becomes complicated, the number of elements increases and the processing load increases. That is, the calculation resources increase in number.

The present disclosure has been made in view of the problem and an object thereof is to provide a technique to associate a texture with three-dimensional shape data with a smaller number of calculation resources.

SUMMARY

The present disclosure is an image generation apparatus having: a first acquisition unit configured to acquire three-dimensional shape data of a background different from a foreground in a captured image; a second acquisition unit configured to acquire a two-dimensional map image to which an element configuring the three-dimensional shape data of the background is allocated; a third acquisition unit configured to acquire a first image based on image capturing at first image capturing timing by an image capturing apparatus and a second image based on image capturing at second image capturing timing by the image capturing apparatus; and a generation unit configured to generate a first color information image indicating color information on an element configuring the three-dimensional shape data of the background based on the two-dimensional map image and the first captured image and generate a second color information image indicating color information on an element configuring the three-dimensional shape data of the background based on the two-dimensional map image used for generation of the first color information image and the second captured image.

Further features of the present disclosure will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention.

First Embodiment

Figure 1A:
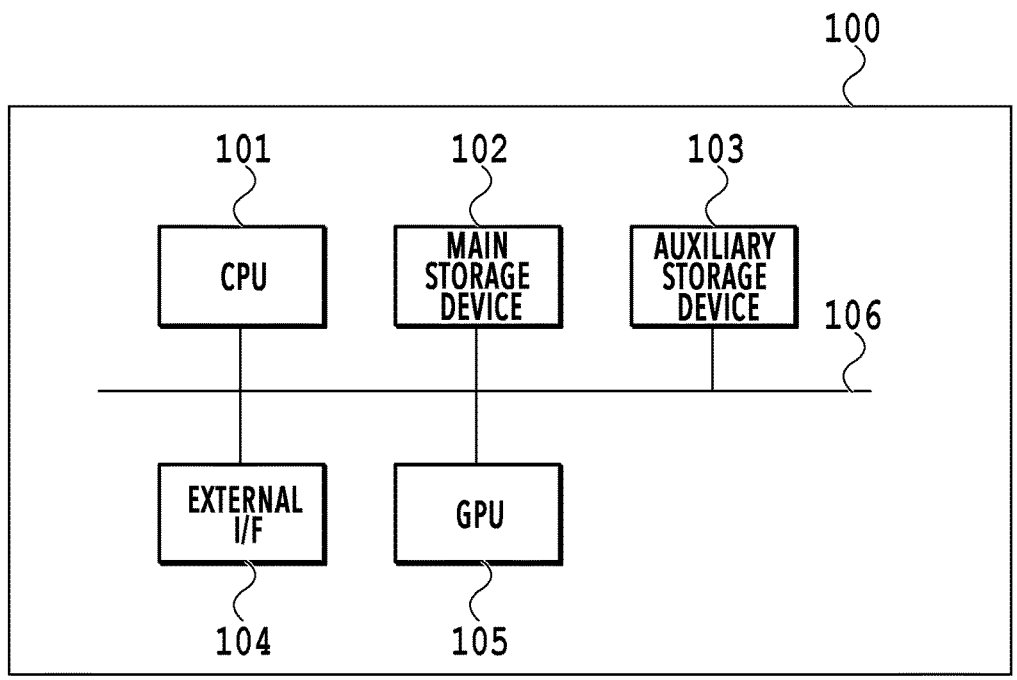
FIG. 1A is a diagram showing a hardware configuration of an image generation apparatus 100.
Figure 1B:
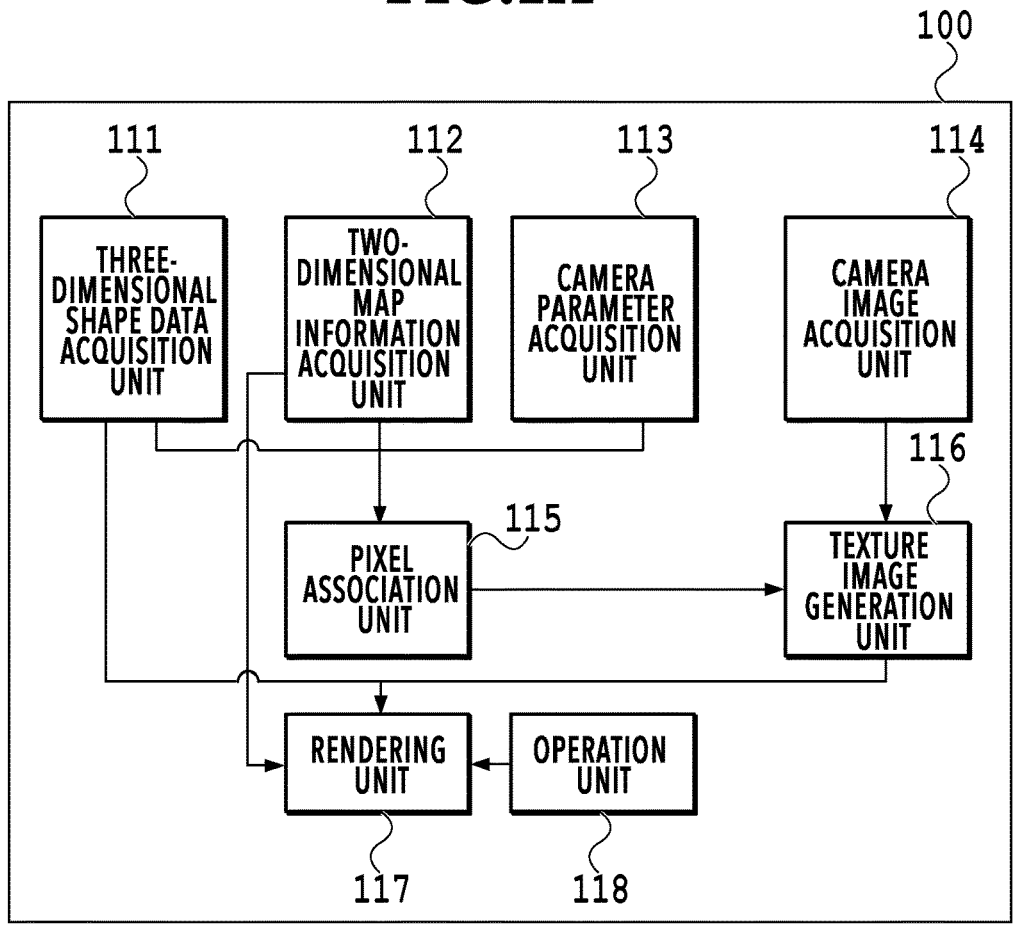
FIG. 1B is a diagram showing a function configuration of the image generation apparatus 100.

FIG. 1A and FIG. 1B are diagrams showing the configuration of the image generation apparatus 100 according to the present embodiment. FIG. 1A is a diagram showing the hardware configuration of the image generation apparatus 100 and FIG. 1B is a diagram showing the function configuration of the image generation apparatus 100. In the following, FIG. 1A and FIG. 1B are explained in this order.

In FIG. 1A, the image generation apparatus 100 comprises a CPU 101, a main storage device 102, an auxiliary storage device 103, an external interface (I/F) 104, and a GPU 105 and these are connected so as to be capable of communication with one another via an internal bus 106.

The CPU 101 is a central processing unit that controls the entire image generation apparatus 100. The main storage device 102 is a storage device that functions as a work area of the CPU 101 and a temporary storage area of various kinds of data. The main storage device 102 is implemented by using storage media, such as a DRAM (Dynamic Random Access Memory) and an SRAM (Static Random Access Memory).

The auxiliary storage device 103 is a storage device that stores information, for example, such as various programs, various kinds of setting information, various kinds of image data, camera parameters, three-dimensional shape data, and a two-dimensional map. The auxiliary storage device 103 is implemented by using nonvolatile memories, such as a ROM (Read Only Memory) and a flash memory, and storage media, such as a hard disk drive (HDD), a solid-state drive (SSD), and tape media.

The external I/F 104 is a communication interface used for communication with an external device, such as a camera, an input interface receiving various operations by a user with a keyboard, a mouse, and the like, a general-purpose input/output interface for inputting and outputting a file from and to an external storage, and the like. The external I/F 104 is implemented by an interface having a connection terminal of a physical cable, such as Ethernet and USB (Universal Serial Bus) or an interface using radio, such a wireless LAN and Bluetooth (registered trademark).

The GPU (Graphics Processing Unit) 105 is a computing device for performing image processing computation at a high speed. The GPU 105 performs rendering processing of an image from a virtual viewpoint and outputs an image signal to an external image display device, such as a television. The I/F that outputs an image signal is implemented by DVI, HDMI (registered trademark), Display Port (registered trademark), SDI, and the like. Further, the GPU 105 may comprise a main storage device different from the main storage device 102. In addition, it is also possible for the GPU 105 to perform part or all of the various kinds of computation performed by the CPU 101.

As above, the hardware configuration of the image generation apparatus 100 is explained, but it is also possible to implement the image generation apparatus 100 by a hardware configuration different from the hardware configuration shown in FIG. 1A. Consequently, for example, it may also be possible to configure the auxiliary storage device 103 outside the image generation apparatus 100 and connect the auxiliary storage device 103 by the external I/F 104. Further, it is also possible to implement the main storage device 102 and the auxiliary storage device 103 by one piece of hardware. In addition, it is also possible to use another piece of hardware, such as FPGA (Field-Programmable Gate Array), in place of the GPU 105. In addition, by the CPU 101 performing processing in accordance with programs stored in the auxiliary storage device 103, the image processing shown in the flowcharts in FIG. 3, FIG. 4, FIG. 9, and FIG. 15, to be described later, is implemented.

Next, by using FIG. 1B, the function configuration of the image generation apparatus 100 is explained. The image generation apparatus 100 generates, as its function, a texture image of three-dimensional shape data from an image captured by a camera and generates a virtual viewpoint image. The image generation apparatus 100 comprises a three-dimensional shape data acquisition unit 111, a two-dimensional map information acquisition unit 112, a camera parameter acquisition unit 113, a camera image acquisition unit 114, a pixel association unit 115, a texture image generation unit 116, a rendering unit 117, and an operation unit 118. It is also possible to implement part or all of the function configuration shown in FIG. 1B by hardware, such as ASIC, FPGA, and GPU.

The texture image is an image indicating a texture of each element (for example, mesh and the like) configuring three-dimensional shape data. Further, the texture includes at least one piece of information of color information, luminance information, and saturation information.

The three-dimensional shape data acquisition unit 111 acquires three-dimensional shape data that is the generation target of a texture image and transmits the acquired three-dimensional shape data to the pixel association unit 115 and the rendering unit 117, to be described later. Here, as the three-dimensional shape data, it is possible to suppose a stadium of a sport, such as baseball and soccer, an event hall, a concert stage, and the like. The three-dimensional shape data is not limited to this and any three-dimensional shape data may be accepted as long as the three-dimensional shape data is shape data of an object that is captured by a camera. Further, in the present embodiment, as the three-dimensional shape data, a mesh model turned into a mesh is used, but this is not limited and three-dimensional shape data in any format may be accepted as long as the three-dimensional shape data is associated with two-dimensional map information, to be described later, such as CAD data and point cloud data.

The two-dimensional map information acquisition unit 112 acquires two-dimensional map information corresponding to the three-dimensional shape data acquired by the three-dimensional shape data acquisition unit 111 and transmits the acquired two-dimensional map information to the pixel association unit 115 and the rendering unit 117, to be described later. Here, the two-dimensional map information is information for associating three-dimensional shape data with a two-dimensional image. For example, the two-dimensional map information is indicated in the UV coordinate system normalized to the range between 0 and 1 and as the two-dimensional map information, data is used in which the vertex of each mesh of the mesh model is associated in a one-to-one manner in the UV coordinate system.

The two-dimensional map information is not necessarily limited to this and information in any format may be accepted as long as three-dimensional shape data and the pixel of a two-dimensional mage can be associated with each other, such as that associated with the pixel coordinates of corresponding image data. Further, the three-dimensional shape data and the two-dimensional map information may be one file and in that case, it may also be possible for the three-dimensional shape data acquisition unit 111 to deliver the two-dimensional map information to the two-dimensional map information acquisition unit 112.

The camera parameter acquisition unit 113 acquires camera parameters calibrated in advance, which relate to the camera having captured the image acquired by the camera image acquisition unit 114, to be described later, and transmits the acquired camera parameters to the pixel association unit 115, to be described later. Here, the camera parameters include external parameters indicating the position, the orientation, and the like of the camera, internal parameters indicating the pixel pitch, the image center, and the like, a distortion parameter indicating the distortion of an image due to a lens, and information relating to other various setting parameters and the like.

The camera image acquisition unit 114 is connected with at least one or more cameras in synchronization and acquires an image in which the object corresponding to the above-described three-dimensional shape data is captured, which is captured by the camera. Further, the camera image acquisition unit 114 has a function to separate the foreground and the background and acquires the image from which the foreground is removed. For example, the camera image acquisition unit 114 takes the moving object, which is the image capturing target, as the foreground, such as a player playing on the field in a case of a stadium and a person who is a performer or the like in an event in a case of an event hall, a concert stage, or the like, and generates a background image from which the foreground is removed. The moving object may be a ball used in a ball game or equipment used in a match or an event (for example, a javelin in the javelin throw, and the like). Further, the background is the filed on which a game is performed, the facility of the venue in which a game takes place, and the like. The spectator stand in the venue is handled as the background.

The pixel association unit 115 associates the pixel on the texture image that is generated and the pixel on the camera image (on the captured image) with each other by using the two-dimensional map information, the three-dimensional shape data, and the camera parameters. The texture image generation unit 116 generates a texture image by copying the pixel on the camera image associated by the pixel association unit 115 to the pixel on the texture image. The texture image generation unit 116 transmits the generated texture image to the rendering unit 117. In a case where a certain pixel on the texture image is associated with the pixel on the camera images captured by a plurality of cameras, it may also be possible for the pixel association unit 115 to perform appropriate selection, combination, and the like of the pixel.

The rendering unit 117 performs rendering of an image (virtual viewpoint image) from a virtual camera that is set by the operation of a user by using the three-dimensional shape data, the two-dimensional map information, and the texture image.

The operation unit 118 receives the operation relating to the setting of a virtual viewpoint of a user, which is input via the input device, such as a joystick, a mouse, and a keyboard. Further, the operation unit 118 receives various operations of a user for the image generation apparatus 100, such as instructions to input/output files relating to the processing of the three-dimensional shape data acquisition unit 111, the two-dimensional map information acquisition unit 112, and the camera parameter acquisition unit 113.

Figure 2A:
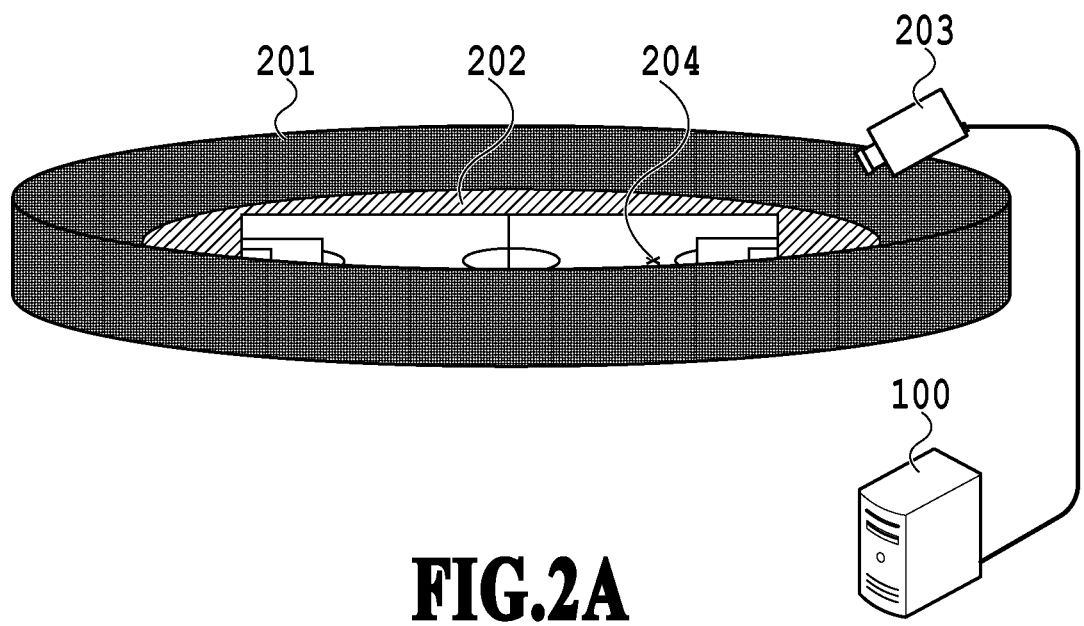
FIG. 2A is a diagram showing image capturing using a camera.
Figure 2B:
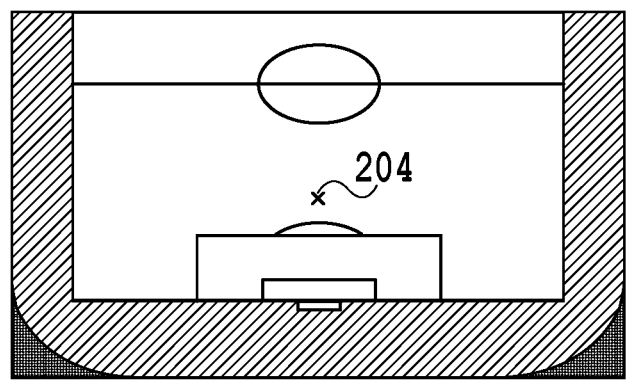
FIG. 2B is a diagram schematically showing an image captured by a camera.

FIG. 2A is a diagram showing image capturing using the camera and FIG. 2B is a diagram schematically showing the image captured by the camera. In FIG. 2A, a stadium 201 comprises a field 202 for a game, such as a soccer ground.

In the present embodiment, explanation is given by taking the soccer ground (that is, the ground for performing a soccer game) as an example of the field 202, but the ground is not necessarily limited to this and a ground for performing another sport may be accepted. Further, it may also be possible to include the structure, such as the soccer goal, the net, and the corner flag, which exists on the field 202 in the stadium 201.

In addition, the object of three-dimensional shape data may be any object as long as it is possible to prepare three-dimensional shape data for the object, such as a stage, a hall in which a concert, an invent, or the like is performed, a building, such as a gymnasium, a plane, such as a forest, a grassy plain, and a desert, and the like, in place of the stadium for a game. Further, in the present embodiment, for convenience, as a shape having a smooth curve, the stadium 201 is defined, but for example, the shape may be approximated to a polygon and a polyhedron by being divided into small triangular or rectangular sides, and the like.

A camera 203 indicates a camera installed in the spectator stand of the stadium 201. The camera 203 performs image capturing so that a position 204 in the vicinity of the front of the goal of the field 202 is the center of the captured image. Then, what schematically shows the image captured by this camera 203 is FIG. 2B.

Here, as regards the camera 203, it is assumed that the camera parameters, such as the position and the orientation, are already acquired by calibration. Further, the camera 203 is connected to the image generation apparatus 100 by a communication line, such as Ethernet. In addition, as a supplement, in the present embodiment, explanation is given on the assumption that the number of cameras is one, but the number of cameras is not necessarily limited to one and it may also be possible to use a plurality of cameras. Further, it may also be possible for the camera 203 to have a function of separating the foreground and the background like the camera image acquisition unit 114 and transmit the separated image to the image generation apparatus 100.

Figure 3:
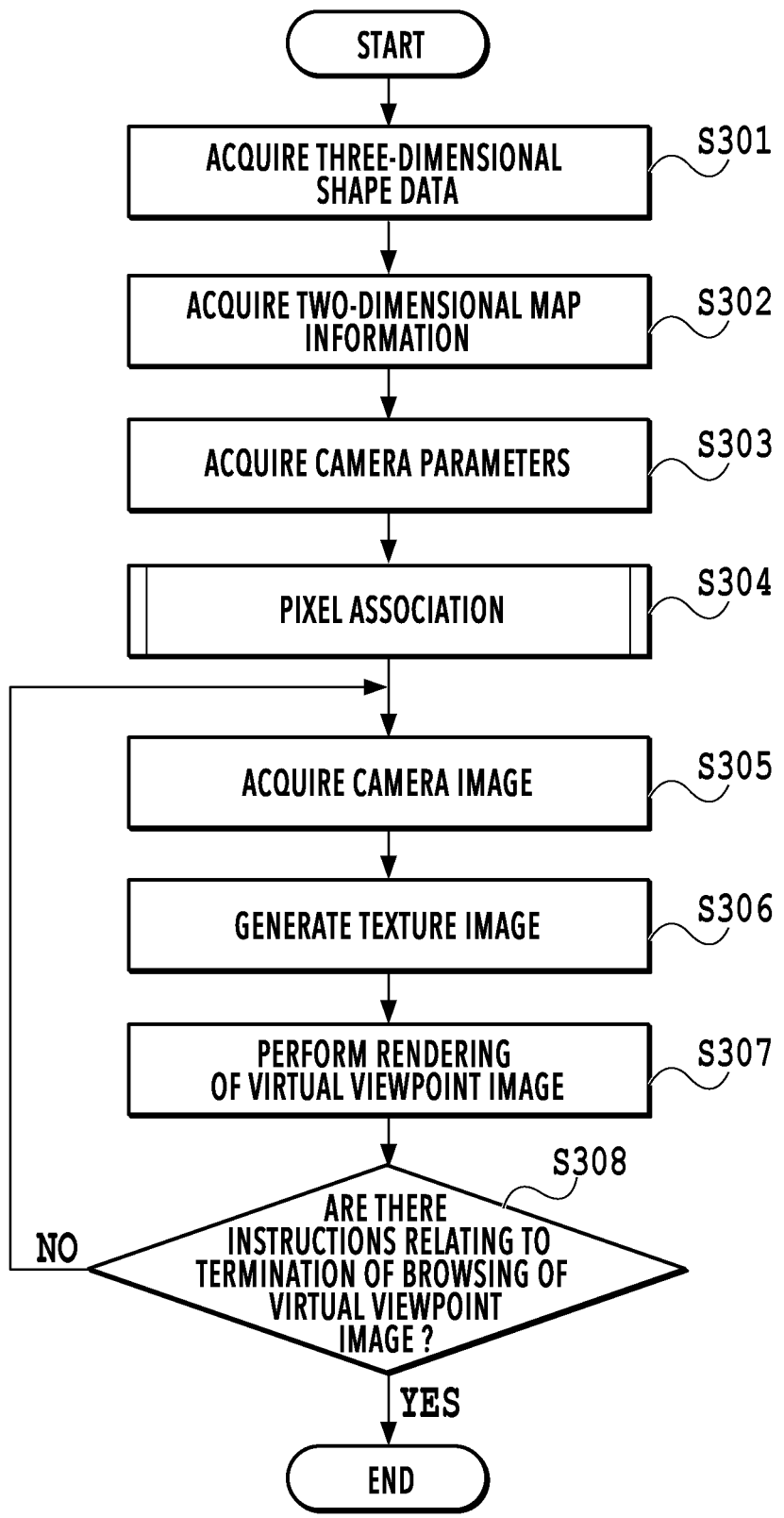
FIG. 3 is a flowchart showing a procedure of generation processing of a virtual viewpoint image in the image generation apparatus.

Next, by using the flowchart in FIG. 3, the procedure of generation processing of a virtual viewpoint image in the image generation apparatus 100 according to the present embodiment is explained. In FIG. 3, it is assumed that symbol "S" in explanation of the flowchart indicates a step. That is, here, step S301 to step S308, which are processing steps, in the flowchart are abbreviated to S301 to S308. This also applies to explanation of the following flowcharts.

At S301, the three-dimensional shape data acquisition unit 111 acquires three-dimensional shape data, which is an image capturing target of a user, from, for example, a predetermined file, such as CAD data, and transmits the acquired three-dimensional shape data to the pixel association unit 115 and the rendering unit 117.

At S302, the two-dimensional map information acquisition unit 112 acquires two-dimensional map information associated with the three-dimensional shape data by a user from a predetermined file and transmits the acquired two-dimensional map information to the pixel association unit 115 and the rendering unit 117. At S303, the camera parameter acquisition unit 113 acquires camera parameters from a predetermined file and transmits the acquired camera parameters to the pixel association unit 115.

At S304, the pixel association unit 115 performs association between the pixel on a texture image to be generated and the pixel on the camera image by using the three-dimensional shape data, the two-dimensional map information, and the camera parameters, which are acquired (S304). Information relating to the association between the pixel on the texture image and the pixel on the camera image is transmitted to the texture image generation unit 116.

Figure 4:
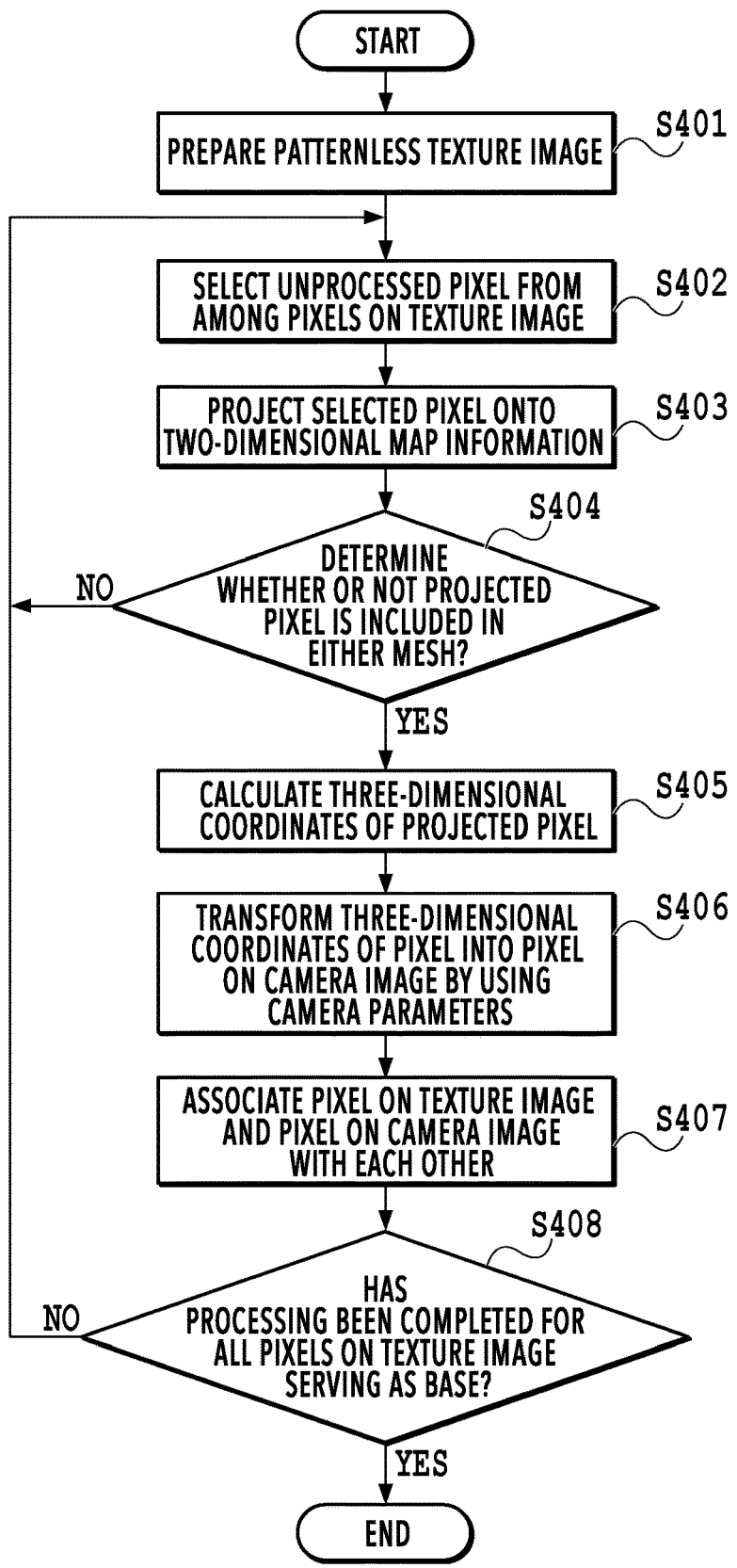
FIG. 4 is a flowchart showing a procedure of processing relating to an association between a pixel on a texture image and a pixel on a camera image.

Here, by using the flowchart in FIG. 4, details of the processing at S304 (that is, processing relating to the association between the pixel on the texture image and the pixel on the camera image) are explained supplementally. At S401, the pixel association unit 115 prepares a patternless texture image, which serves as a base. It may also be possible to use an arbitrary size and an arbitrary color for the patternless texture image serving as a base and it may also be possible for a user to specify in advance an arbitrary color or input by a file.

Figure 5A:
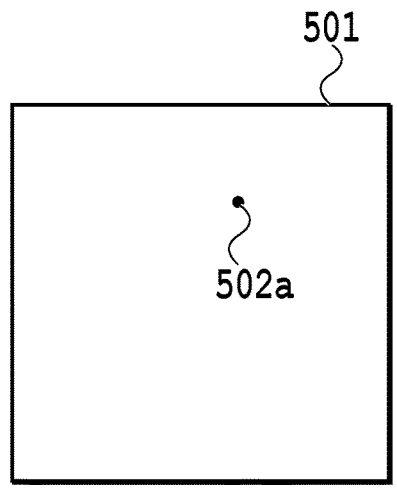
FIG. 5A is a schematic diagram showing a texture image serving as a base.

At S402, the pixel association unit 115 selects an unprocessed pixel from among the pixels on the patternless texture image serving as a base, which is prepared at S401. Here, the unprocessed pixel refers to a pixel for which the processing at S403 to S407, to be described later, has not been performed yet. FIG. 5A is a schematic diagram showing a texture image serving as a base. In FIG. 5A, the pixel association unit 115 selects a pixel at coordinates 502*a*, which is an unprocessed pixel, from among the pixels on a texture image 501 serving as a base.

Figure 5B:
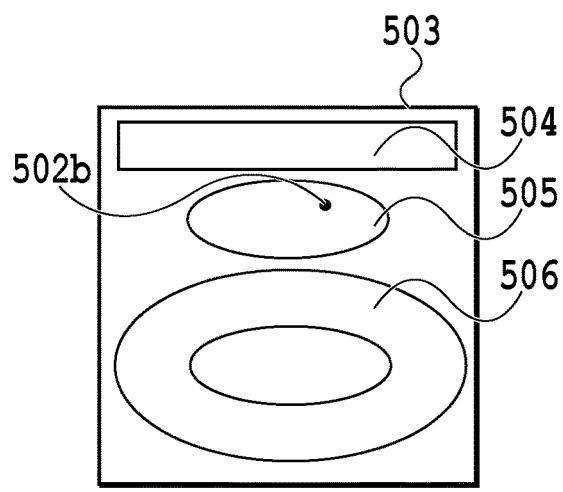
FIG. 5B is a schematic diagram schematically showing two-dimensional map information.

At S403, the pixel association unit 115 projects the pixel selected at S402 onto the two-dimensional map information acquired from the two-dimensional map information acquisition unit 112. FIG. 5B is a schematic diagram schematically showing the two-dimensional map information associated with the stadium 201 and the field 202, which are the three-dimensional shape data. The pixel association unit 115 projects the pixel 502*a* selected at S402 onto two-dimensional map 503 information and acquires coordinates 502*b* on the two-dimensional map information.

In FIG. 5B, a mesh 504 is a mesh indicating the external wall portion of the stadium 201, a mesh 505 is a mesh indicating the field 202, and a mesh 506 is a mesh indicating the spectator stand of the stadium 201. In FIG. 5B, for convenience of explanation, each mesh is defined as one mesh, but this is not necessarily limited. Consequently, for example, in a case where a mesh is defined as a polygon or a polyhedron, each mesh is defined by being divided into triangles or rectangles.

At S404, the pixel association unit 115 determines whether or not the pixel 502*a* projected on the two-dimensional map 503 information (that is, the coordinates 502*b* onto the two-dimensional map 503 information) is included in either mesh. In FIG. 5B, the coordinates 502*b* are coordinates inside the mesh 505, and therefore, the pixel association unit 115 determines that the coordinates 502*b* are included in the mesh 505.

In a case of determining that the pixel 502*a* projected onto the two-dimensional map 503 information is not included in any mesh (No at S404), the pixel association unit 115 returns the processing to S402. In a case of determining that the pixel 502*a* projected onto the two-dimensional map 503 information is included in either mesh (Yes at S404), the pixel association unit 115 advances the processing to S405.

In the present embodiment, the example is shown in which the pixel 502*a* is projected onto the two-dimensional map information, but the example is not necessarily limited to this. Consequently, for example, on the contrary, it may also be possible to determine in which mesh on the two-dimensional map information the coordinates 502*a* are included by projecting the meshes 504, 505, and 506 on the two-dimensional map information onto the texture image 501 serving as a base.

At S405, the pixel association unit 115 calculates three-dimensional coordinate information corresponding to the coordinates 502*b* associated with the mesh in which the pixel 502*a* projected onto the two-dimensional map 503 information is included from the three-dimensional shape data.

Figure 5C:
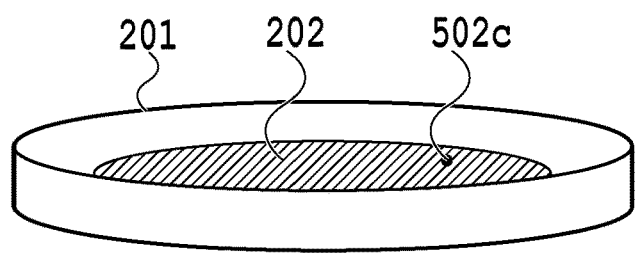
FIG. 5C is a schematic diagram showing three-dimensional shape data.

The calculation of the three-dimensional coordinate information is explained supplementally by using FIG. 5C. FIG. 5C is a schematic diagram showing the three-dimensional shape data of the stadium 201 and the field 203. The mesh 505 corresponds to the field 202 of the three-dimensional shape model and the pixel association unit 115 calculates (derives) that the coordinates 502*b* on the mesh 505 are the position of three-dimensional coordinates 502*c* shown in FIG. 5C.

Figure 5D:
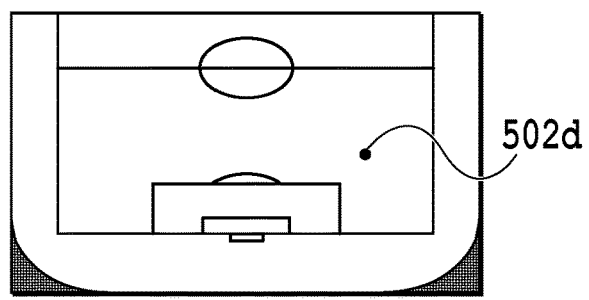
FIG. 5D is a diagram schematically showing an image captured by a camera.

At S406, the pixel association unit 115 transforms the calculated three-dimensional coordinates into the pixel on the camera image by using the camera parameters acquired from the camera parameter acquisition unit 113. Here, FIG. 5D is a diagram schematically showing the image captured by the camera 203 and in a case where the calculated three-dimensional coordinates are projected onto the camera image of the camera 203 by using the camera parameters of the camera 203, the three-dimensional coordinates 502*c* are transformed as a pixel 502*d*.

At S407, the pixel association unit 115 associates the pixel on the texture image, which is selected at S402, and the pixel on the camera image, which is transformed at S406, with each other. Specifically, the pixel 502*a* on the texture image serving as a base and the pixel 502*d* obtained by the processing at S402 to S406 are associated each other.

At S408, in a case of determining that the processing has been completed for all the pixels on the texture image 501 serving as a base (Yes at S408), the pixel association unit 115 terminates the processing shown in FIG. 4. In a case of determining that the processing has not been completed for all the pixels on the texture image 501 serving as a base (No at S408), the pixel association unit 115 returns the processing to S402. As described above, by performing the processing shown in the flowchart in FIG. 4, it is possible to associate the pixel on the texture image and the pixel on the camera image with each other.

Returning to FIG. 3, at S305, the camera image acquisition unit 114 acquires the image (camera image) captured by the camera and transmits the acquired camera image to the texture image generation unit 116. At S306, the texture image generation unit 116 generates a texture image from the camera image based on the information relating to the association between the pixel on the texture image and the pixel on the camera image and transmits the generated texture image to the rendering unit 117.

Figure 6:
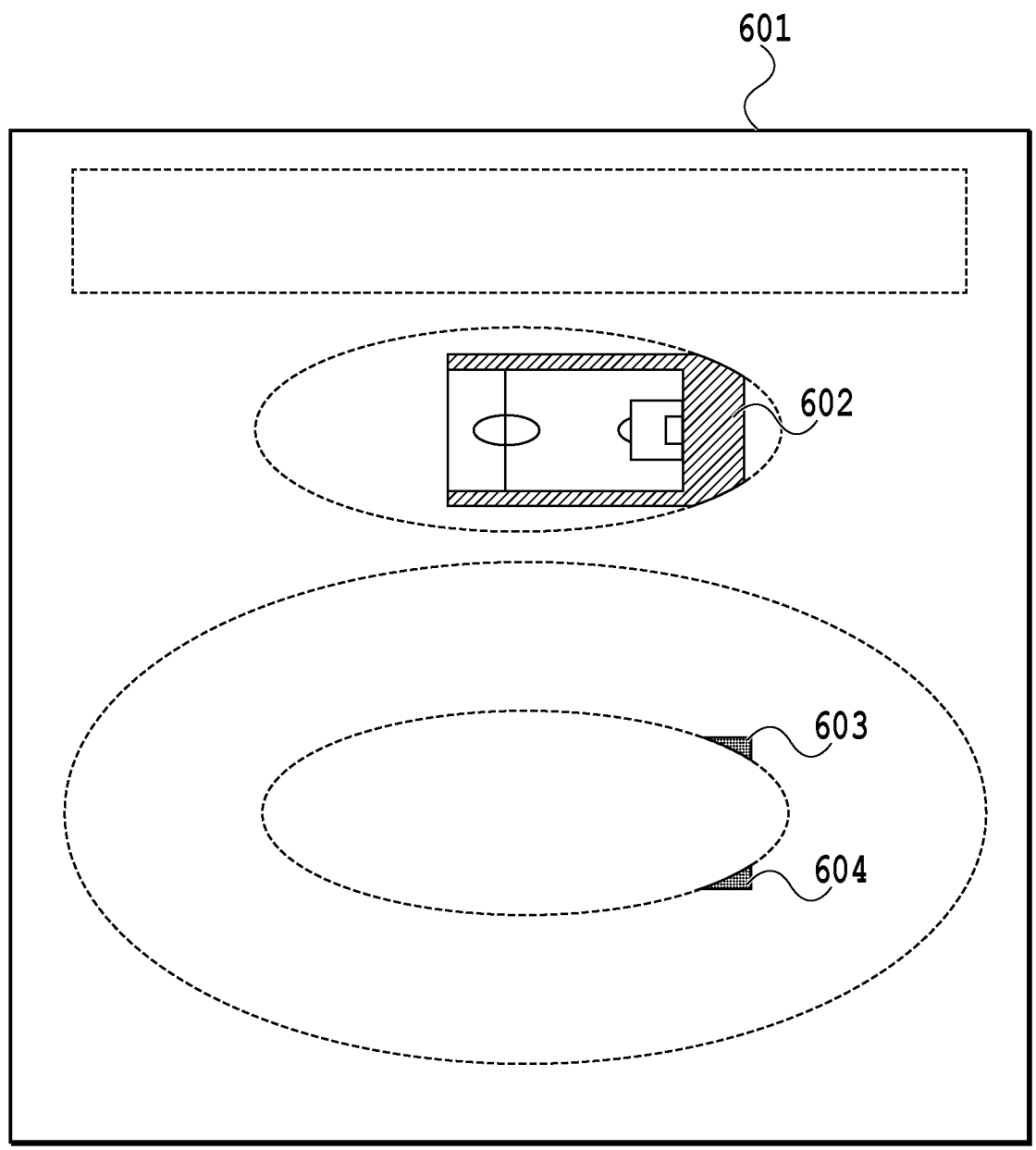
FIG. 6 is a diagram showing a texture image.

FIG. 6 is a diagram showing the texture image that is generated by performing the processing shown in the flowchart in FIG. 3 and FIG. 4. In more detail, FIG. 6 shows a texture image 601 that is generated from the camera image shown in FIG. 2B by using the pixel on the camera image that is associated with the pixel on the texture image by performing the processing shown in the flowcharts in FIG. 3 and FIG. 4.

In FIG. 6, each pixel on the camera image shown in FIG. 2B is associated with the texture image and the texture image is generated in which the field 202 is generated as symbol 602 and a part of the spectator stand is generated as symbol 603 and symbol 604. The pixels other than symbol 602, symbol 603, and symbol 604 on the texture image 601 do not correspond to the pixels on the camera image, and therefore, the processing is not performed at all.

At S307, the rendering unit 117 performs rendering of an image (virtual viewpoint image) from a virtual camera that is set by the operation of a user by using the three-dimensional shape data, the two-dimensional map information, the texture image, and the camera parameters. The rendering unit 117 transmits the image for which rendering has been performed to an external image display device as an image signal.

Figure 7A:
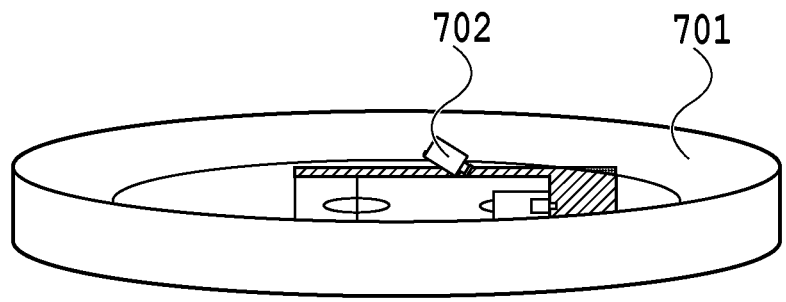
FIG. 7A is a diagram schematically showing three-dimensional shape data of a stadium and a virtual camera.
Figure 7B:
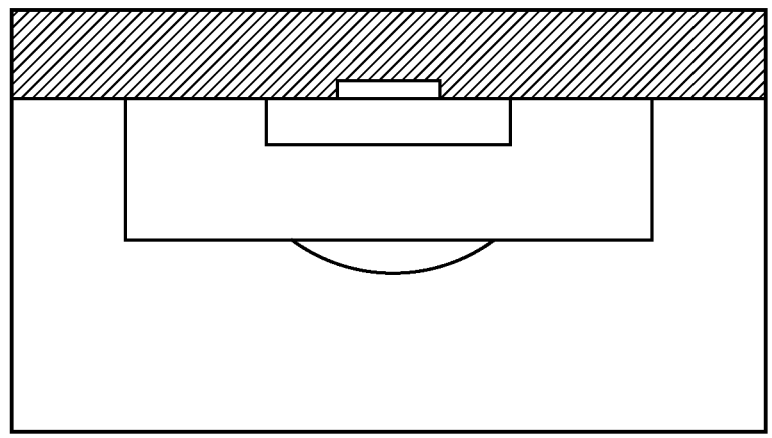
FIG. 7B are results of performing rendering of an image from a virtual camera.

FIG. 7A and FIG. 7B are diagrams for explaining the virtual viewpoint image that is generated by the rendering unit 117. FIG. 7A is a diagram schematically showing three-dimensional shape data 701 of the stadium, which is generated by using the two-dimensional map information, the three-dimensional shape data, and the texture image 601 and the way a virtual camera 702 is capturing a virtual viewpoint image. Further, FIG. 7B is the results of performing rendering of an image from the virtual camera 702 in the state shown in FIG. 7A. By referring to 7B, the way rendering is performed for the image in a case where the three-dimensional shape data 701 to which the image captured by the camera 203 is attached is viewed from the viewpoint of the virtual camera 702, and the virtual viewpoint image is generated is known. In a case where there are instructions relating to termination of browsing of the virtual viewpoint image by a user at S308 (Yes at S308), the image generation apparatus 100 terminates the processing shown in FIG. 3. Further, in a case where there are not instructions relating to termination of browsing of the virtual viewpoint image by a user (No at S308), the image generation apparatus 100 returns the processing to S305.

As explained above, according to the image generation apparatus according to the present embodiment, by generating a texture image corresponding to three-dimensional shape data by using an image captured by a camera, it is possible to associate a texture with three-dimensional shape data with a smaller number of calculation resources.

In the present embodiment, the camera image may be a moving image (video image). In that case, the processing shown in the flowchart in FIG. 4 is performed at predetermined intervals and due to this, for example, a change in weather, shadow by cloud, and in addition, a change in the turf on the field, and the like become to be reflected, and therefore, it is possible to generate a moving image with a more feeling of being at a live performance than that of a still image. As a supplement, in this case, updating of the texture image is performed, at the maximum, each time the video image is updated at the frame rate of the moving image. It may also be possible to update the texture image by using the frame (image) acquired at the time of image capturing at the first image capturing timing and further update the texture image by using the frame (image) based on the image capturing at the second image capturing timing different from the first image capturing timing. In this case, as the two-dimensional map on which the texture image is based, it may also be possible to use the same two-dimensional map at the time of updating. That is, in a case where the texture image is updated by using the frame (image) acquired at the time of image capturing at the first image capturing timing, and after that, the texture image is updated by using the frame (image) acquired at the time of image capturing at the second image capturing timing, the following is performed. That is, at the time of updating the texture image by using the frame (image) acquired at the time of image capturing at the second image capturing timing, the same two-dimensional map as that used at the time of updating the texture image by using the frame (image) acquired at the time of image capturing at the first image capturing timing is used. The reason is that the three-dimensional shape of the background hardly changes during image capturing, and therefore, it is not necessary to update the two-dimensional map corresponding thereto. With this configuration, it is only required to determine the color information on the element configuring the three-dimensional shape data for the component of the two-dimensional map each time the texture image is updated, and therefore, it is possible to reduce the load of the image processing due to updating.

Further, in the present embodiment, explanation is given on the assumption that the number of cameras is one, which captures the field, but the number of cameras is not necessarily limited to one. Consequently, for example, in a case where a camera that captures the spectator stand is added and the texture image of the spectator stand is generated as a moving image as in the present embodiment, it is possible to add the way players are cheered on, and therefore, it is possible to generate a video image with a more feeling of being at a live performance. As described above, by increasing the number of cameras, it is possible to increase the area of the texture image that is generated on the texture image 601 and it is also possible to create an association with the camera pixels in the all the ranges associated with the three-dimensional shape data by the two-dimensional map information.

In addition, in the present embodiment, in a case where the processing at S301 to S304 is performed once, the processing is not performed again even though the camera image is updated, but the present embodiment is not necessarily limited to this. Consequently, in a case where the data, such as the three-dimensional shape data, the two-dimensional map information, and the camera parameters, is changed by a user, it may also be possible to perform the processing at S301 to S304 shown in the flowchart in FIG. 3 described above again at arbitrary timing set in advance.

Further, the processing at S301 to S303 is only required to be performed before the processing at S304 is performed and it may also be possible to perform the processing at S305 in parallel to the processing at S301 to S303.

Second Embodiment

Figure 8:
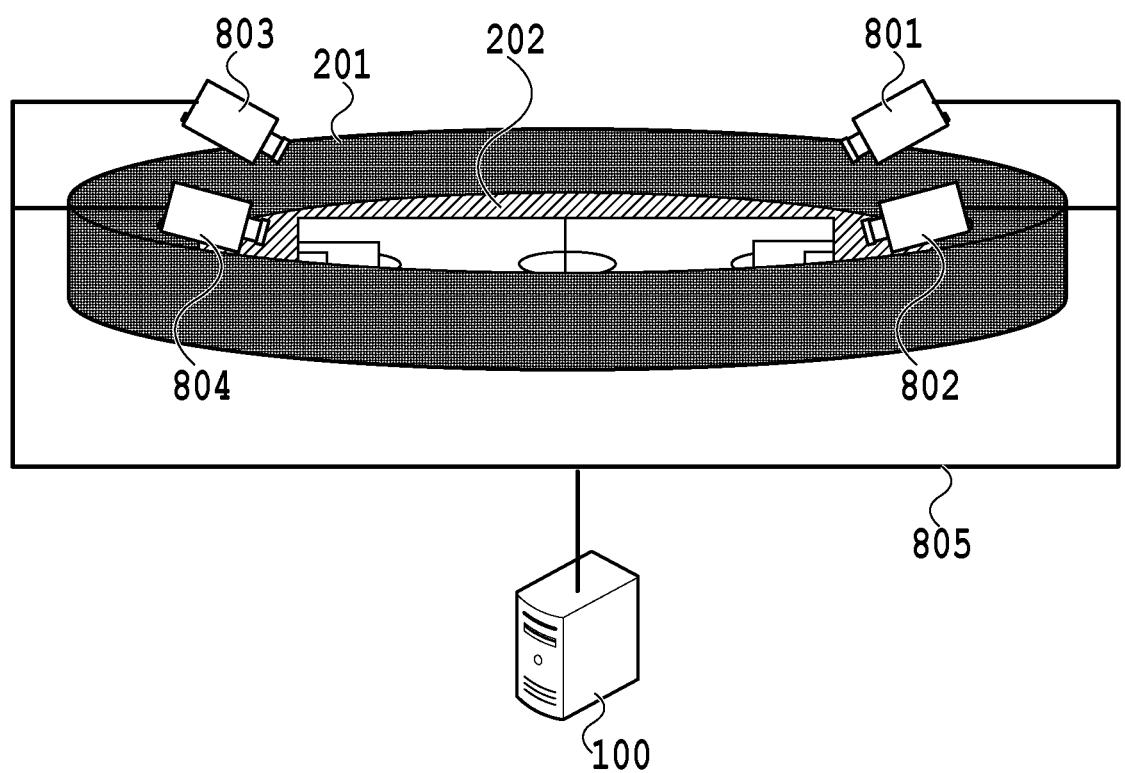
FIG. 8 is a diagram showing the way image capturing is performed by using a plurality of cameras.

As described above, in the first embodiment, explanation is given on the assumption that the number of cameras is one, but in the present embodiment, explanation is given on the assumption that the number of cameras is two or more. FIG. 8 is a diagram schematically showing image capturing using four cameras. As shown in FIG. 8, to the four cameras 801, 802, 803, and 804, the image generation apparatus 100 is connected via a communication line 805.

For the cameras 801, 802, 803, and 804, calibration has been performed in advance and the image capturing timing thereof has been synchronized in advance. Further, the cameras 801, 802, 803, and 804 transmit captured images to the image generation apparatus 100 by using the communication line 805. The communication line 805 is configured by, for example, Ethernet or the like and is a line capable of bidirectional communication with the image generation apparatus 100 and the cameras 801, 802, 803, and 804.

The image generation apparatus 100 generates a texture image in accordance with the flowchart in FIG. 3 described above and here, explanation is given by focusing attention on points different from FIG. 3 (the first embodiment) (specifically, the pixel association processing at S304 and the texture image generation processing at S306).

Figure 9:
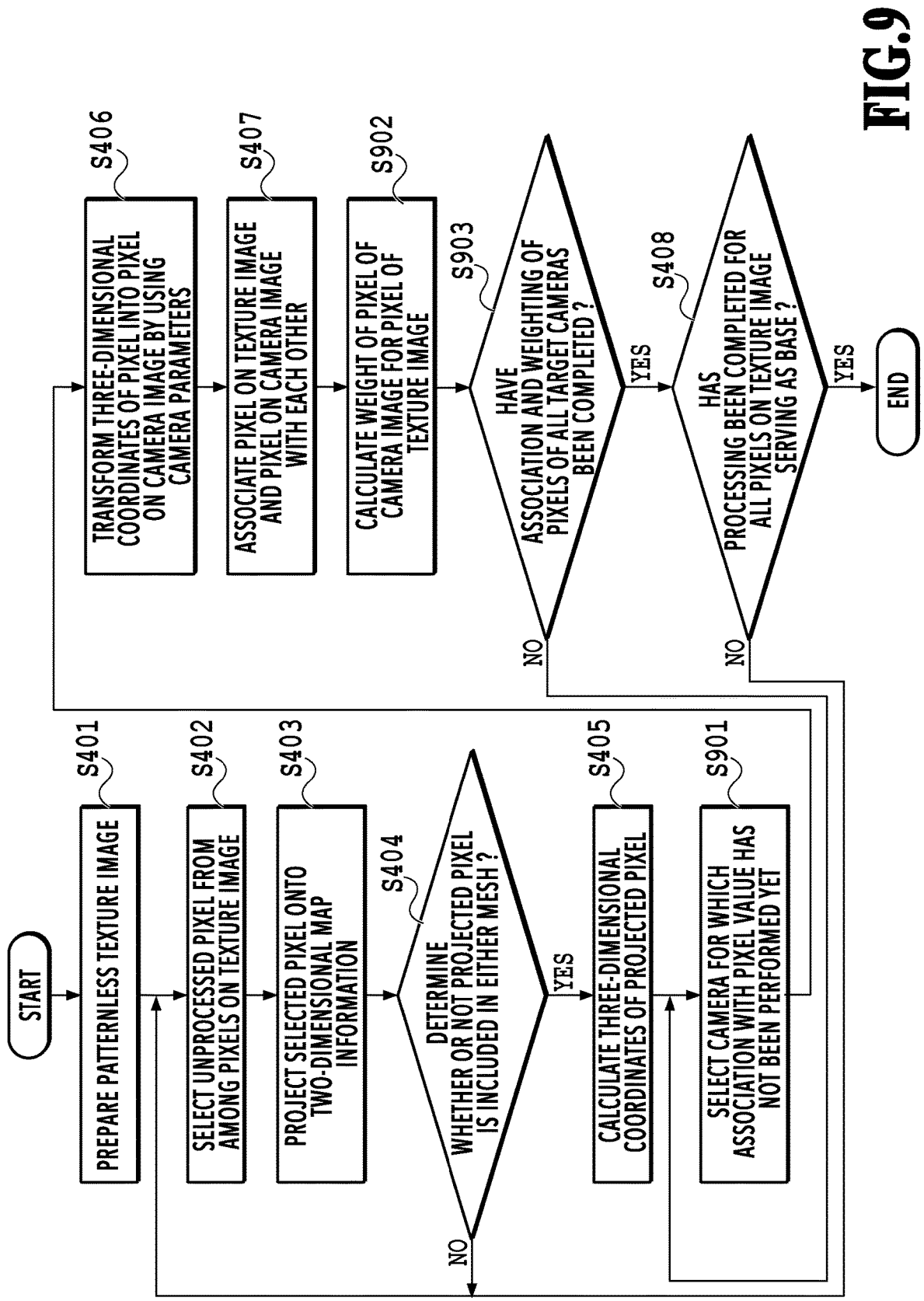
FIG. 9 is a flowchart showing a procedure of processing relating to an association between a pixel on a texture image and a pixel on a camera image.

FIG. 9 is a flowchart showing a procedure of the processing at S304 (that is, the processing relating to the association between the pixel on the texture image and the pixel on the camera image). After the processing at S401 to S405 is performed and the three-dimensional coordinates corresponding to the coordinates associated with a mesh are calculated, at S901, the pixel association unit 115 selects a camera for which association with a pixel value has not been performed yet. For example, the pixel association unit 115 selects the camera 801.

After transformation into coordinates on the camera image of the camera 801 is performed at S406 and S407 and the pixel on the texture image and the pixel on the camera image are associated with each other, at S902, the pixel association unit 115 calculates the weight of the pixel of the camera image for the pixel of the texture image. Here, the weight of the pixel of the camera image refers to a relative ratio indicating the degree of influence of each pixel at the time of combining a plurality of pixels of the camera image used in generation of the texture image.

Figure 10A:
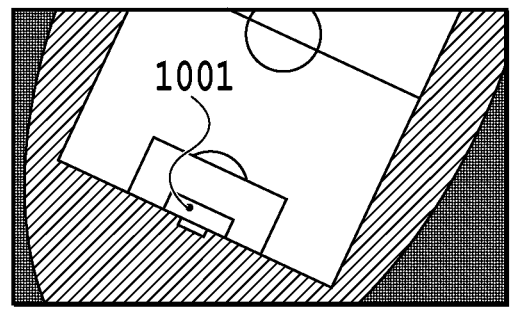
FIG. 10A is a diagram showing an image captured by a camera 801.
Figure 10B:
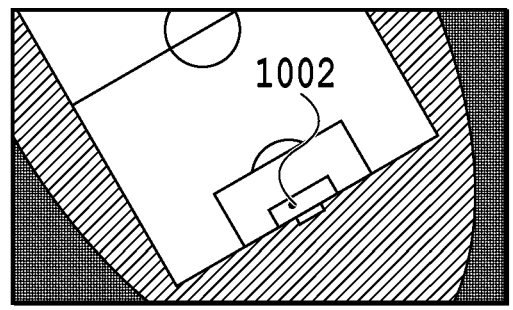
FIG. 10B is a diagram showing an image captured by a camera 802.
Figure 10C:
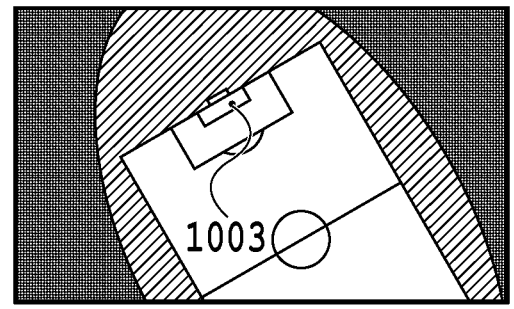
FIG. 10C is a diagram showing an image captured by a camera 803.
Figure 10D:
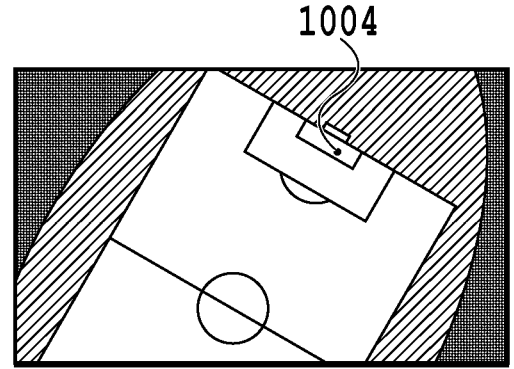
FIG. 10D is a diagram showing an image captured by a camera 804.

In the following, by using FIG. 10A to FIG. 10D, FIG. 11, and FIG. 12, the weight calculation performed by the pixel association unit 115 is explained. FIG. 10A to FIG. 10D are each a diagram showing an image captured by each camera. FIG. 10A shows an image captured by the camera 801 and similarly, FIG. 10B shows an image captured by the camera 802, FIG. 10C shows an image captured by the camera 803, and FIG. 10D shows an image captured by the camera 804.

The results of associating the pixel on the texture image with the pixel on the image captured by each camera are shown as a pixel 1001, a pixel 1002, a pixel 1003, and a pixel 1004 in each of FIG. 10A to FIG. 10D. In this case, how to find the weight of the pixel 1001 is explained by using FIG. 11.

Figure 11:
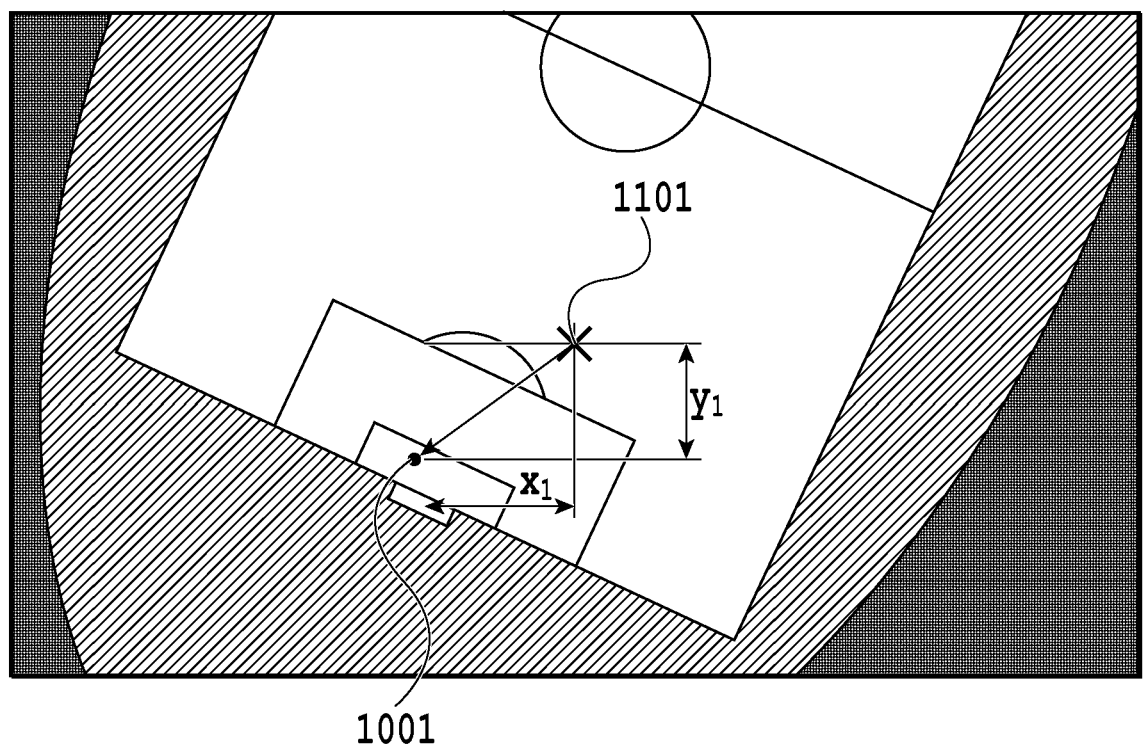
FIG. 11 is a diagram showing a distance from center coordinates of an image to a pixel.

In FIG. 11, it is known that the pixel 1001 is located at the position shifted from a center 1101 of the image captured by the camera 801 by x1 in the x-axis direction and by y1 in the y-axis direction. That is, the distance from the center coordinates of the image captured by the camera 801 to the pixel 1001 is shown by formula (1) below.

$$\sqrt{x_1^2 + y_1^2} \qquad \text{[Formula 1]}$$

Similarly, the distance from the center coordinates of the image captured by the camera 802 to the pixel 1002, the distance from the center coordinates of the image captured by the camera 803 to the pixel 1003, and the distance from the center coordinates of the image captured by the camera 804 to the pixel 1004 are calculated respectively. Here, as regards weighting, in order to increase the weight as the pixel approaches the center of the image, for example, the inverse of the value of formula (1) described above is calculated and the value of formula (2) below is used.

$$\frac{1}{\sqrt{x_1^2 + y_1^2}} \qquad \text{[Formula 2]}$$

In this manner, the inverse of the distance from the center coordinates of the image captured by each camera to the pixel is found as formula (3), formula (4), and formula (5) below for each of the pixel 1002, the pixel 1003, and the pixel 1004.

$$\frac{1}{\sqrt{x_2^2 + y_2^2}} \qquad \text{[Formula 3]}$$

$$\frac{1}{\sqrt{x_3^2 + y_3^2}} \qquad \text{[Formula 4]}$$

$$\frac{1}{\sqrt{x_4^2 + y_4^2}} \qquad \text{[Formula 5]}$$

Figure 12:
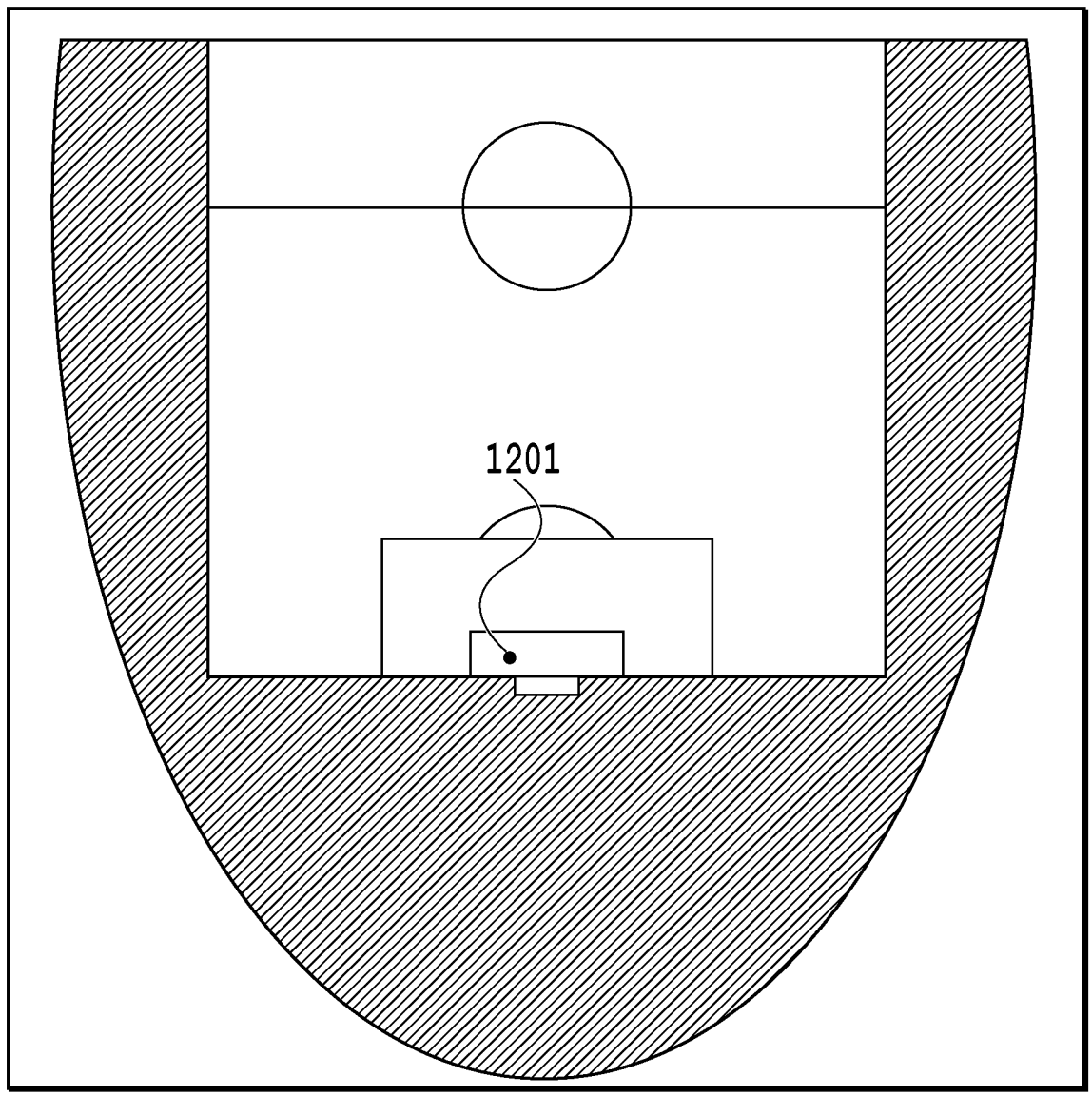
FIG. 12 is a diagram schematically showing a texture image generated by a texture image generation unit.

Following the above, the processing to generate the texture image at S306 is explained. FIG. 12 is a diagram schematically showing the texture image generated by the texture image generation unit 116. In FIG. 12, a pixel 1201 indicates the pixel of the texture image, with which the pixels of the pixel 1001 to the pixel 1004 described above are associated. In order to generate the pixel 1201, formula (2) to formula (5) described above are used. First, all the weights are added as in formula (6) below.

$$\frac{1}{\sqrt{x_1^2 + y_1^2}} + \frac{1}{\sqrt{x_2^2 + y_2^2}} + \frac{1}{\sqrt{x_3^2 + y_3^2}} + \frac{1}{\sqrt{x_4^2 + y_4^2}} \qquad \text{[Formula 6]}$$

Next, for each pixel value, "pixel value×weight/formula (6)" is calculated and all the found values of each pixel are added. In this manner, to each of the pixels 1001 to 1004 of the images captured by each of the cameras 801 to 804, corresponding formulas (formulas (2) to (5)) is applied, and further, formula (6) is calculated and "pixel value×weight/formula (6)" is found, and thereby, the pixel 1201 of the texture image is generated. The above-described weighting is merely exemplary and the weighting is not necessarily limited to this. Consequently, for example, it is not necessary to calculate the square root as shown in formula (7) below.

$$\frac{1}{x_1^2 + y_1^2} \qquad \text{[Formula 7]}$$

Further, it may also be possible to use, for example, a map or the like in which the center portion is normalized to 1 and the peripheral portion to 0 or to a value close to 0. That is, any method may be accepted in which the distance from the center coordinates is used and the weight changes from the center toward the peripheral portion, that is, the weight of the peripheral portion only needs to be small compared to that of the center.

Further, in the present embodiment, as the weight, the weight is calculated in accordance with the distance from the center of the image captured by the camera, but the calculation of the weight is not necessarily limited to this. For example, it may also be possible to find the resolution of the pixel on the camera image corresponding to the texture image and set the weight based on the resolution. Further, it may also be possible to set the weight based on the inverse of the resolution and in this case, it is possible to increase the weight of the pixel whose resolution is high.

Figure 13:
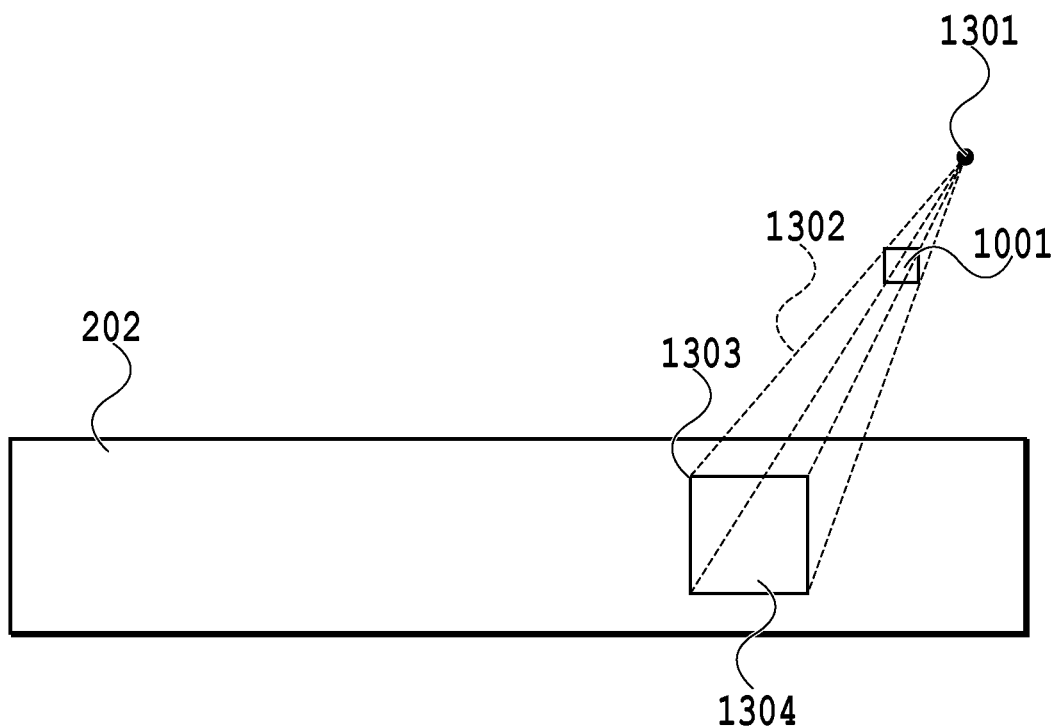
FIG. 13 is a diagram showing the way the resolution of a pixel is found.

It may also be possible to find the resolution of the pixel on the camera image by calculation or separately measure the resolution by using a sensor or a measuring instrument. In the following, this point is explained supplementally by using the drawings. FIG. 13 is a diagram showing the way the resolution of the pixel 1001 is found. In FIG. 13, first, a straight line 1302 that extends from an optical center 1301 of the camera and passes one of the vertexes configuring the pixel 1001 is found and an intersection 1303 at which the straight line 1302 intersects with the field 202, which is an object, is found. Further, by calculating the intersections 1303 at which the straight lines intersect with the field 202 for the remaining three vertexes of the vertexes configuring the pixel 1001, a plane 1304 corresponding to the pixel 1001 three-dimensionally is found.

Next, the inverse of the area of the plane 1304 is stored as the weight of each pixel. As described above, by actually replacing the pixel on the camera image three-dimensionally and setting the inverse of the area as the weight, it is possible to increase the weight of the pixel whose resolution is high.

Explanation is returned to FIG. 9. At S903, the pixel association unit 115 advances the processing to S409 in a case where the association and the weighting of the pixels of all the target cameras are completed for the selected pixels on the texture image, or returns the processing to S901 in a case where the association and the weighting are not completed. As a supplement, in the example of the resolution described above, like the pixel 1001, after the inverses of the areas of the planes corresponding three-dimensionally thereto are found for the pixel 1002 of the camera 802, the pixel 1003 of the camera 803, and the pixel 1004 of the camera 1004, the processing is caused to advance to S409.

As the weighting method, it may also be possible to find the inner product of the normal vector possessed by the plane corresponding to the pixel on the texture image and the vector indicating the orientation of the camera, both being normalized, and increase the pixel whose inner product is small. Further, in a case where the inner product has a positive value, it may also be possible to determine that the plane is the backside and not to use the pixel on the camera image, which is associated with the pixel on the texture image. Furthermore, it is also possible to consider a method of taking the calculated inner product multiplied by "−1" as the weight, and the like.

In addition, the pixel of the camera may be weighted by using the distance to the object and may also be weighted by the inverse of the distance to the object. It may also be possible to find the distance to the object by computation or measure the distance by using a measuring instrument, such as a sensor.

In addition, it may also be possible for a user to set in advance a fixed weight for each of the cameras 801, 802, 803, and 804. Alternatively, it may also be possible to set a weight in accordance with the kind of camera. For example, it may also be possible to increase the weight of a camera whose performance is high, such as the number of sensor pixels, the dynamic range, and the kind of attached lens.

Further, it may also be possible to generate texture images by a plurality of methods by changing the weighting method, the setting of the parameters in the method, and the like, and perform rendering by switching the texture images generated by the plurality of methods at the time of generation of a virtual viewpoint image.

Furthermore, it may also be possible to determine the order of weighting by the method such as that described above and provide the weight parameters themselves separately. For example, in a case where the priority order of the camera having the highest priority is assumed to be 1, the subsequent cameras may be given ½, ⅓, ¼, . . . , 1/n, or a user may determine an arbitrary ratio.

Further, in the present embodiment, all the four cameras, that is, the camera 801 to the camera 804 are used, but the present embodiment is not necessarily limited to this. That is, at the time of generation of the pixel 1201 of the texture image, the weight is attached to each of the pixel 1001 to the pixel 1004 and combination thereof is performed, but the present embodiment is not necessarily limited to this. For example, it may also be possible to compare the order of the magnitude of the attached weight of the pixel 1001 to the pixel 1004 scheduled to be used at the time of generation of the texture image, and determine the priority order in accordance with the magnitude of the weight and further, use only the pixels of the cameras having the top N largest weights. In this case, N is a value larger than or equal to at least one. For example, in a case where N is three, on a condition that the weight of the pixel 1004 is the smallest, it may also be possible to calculate formula (6) by using the pixel 1001 to the pixel 1003 except for the pixel 1004 and combine the pixel 1001 to the pixel 1003.

Further, in the present embodiment, the pixel on the texture image and the pixel on the camera image are associated with each other in a one-to-one manner, but the present embodiment is not necessarily limited this and it may also be possible to associate the pixel on the texture image with pixels including pixels around the found coordinates and weight the pixels. In this case, it may also be possible to perform weighting by taking the weight of the corresponding pixel as 1 and the weight of each of the surrounding pixels as 1/N. Further, it may also be possible to perform weighting by calculating the weights of the surrounding pixels by using the value of the fractional part of the found coordinates, or perform weighting by increasing the weight of the pixel adjacent in the positive direction of the X-coordinate as the value of the fractional part of the found X-coordinate of the pixel increases.

As a supplement, in the present embodiment, for example, the example is explained in which the texture image is generated by using a plurality of cameras whose image capturing timing is synchronized by taking into consideration that the corner flag and the like are included in the stadium 201, but the example is not necessarily limited to this. Consequently, for example, it may also be possible to take only the stadium as the background (that is, assuming that the background does not change dynamically) and generate the texture image by performing image capturing at a plurality of positions and with a plurality of orientations using one camera, and weighting the plurality of captured images.

Third Embodiment

Figure 14:
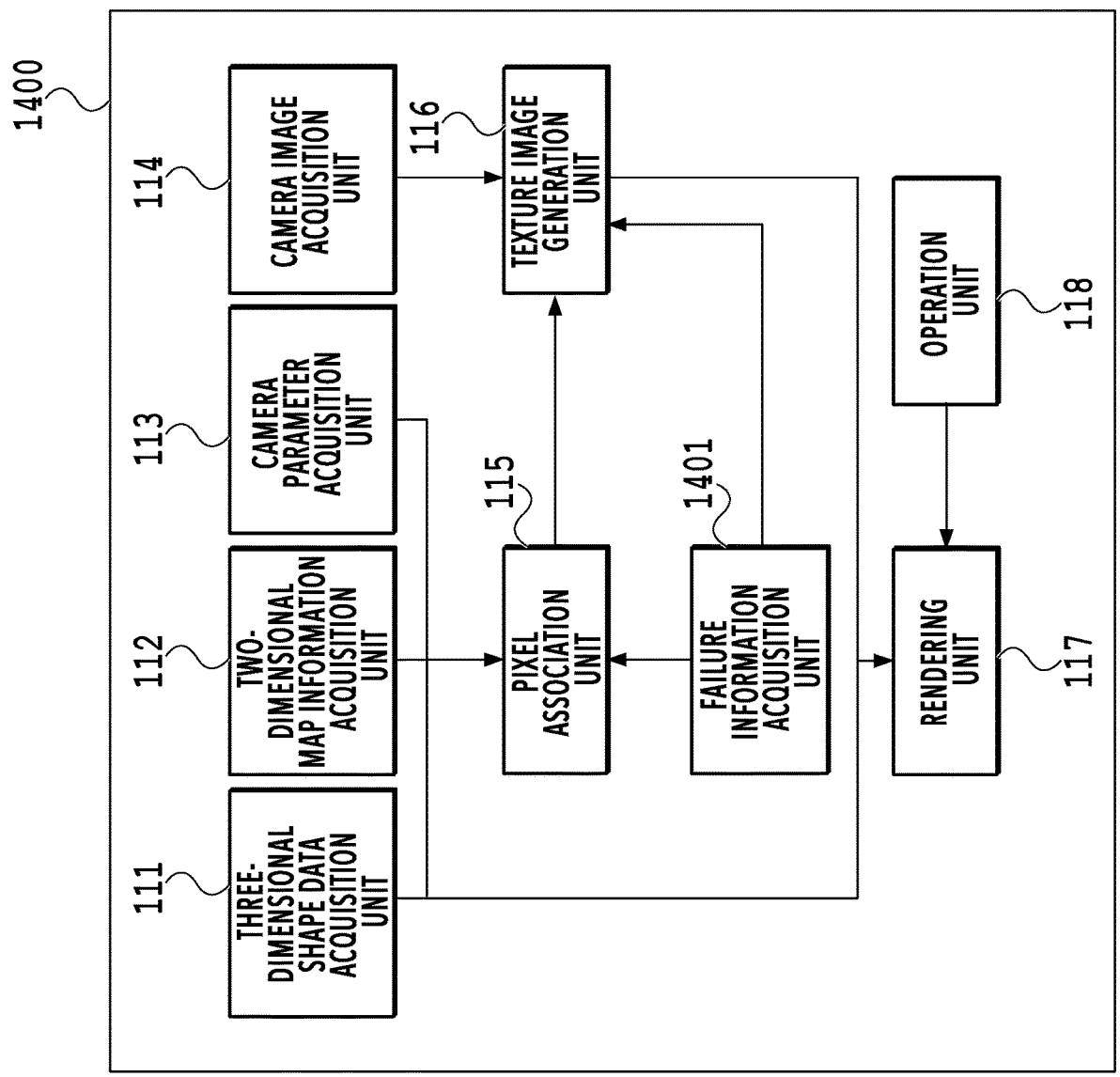
FIG. 14 is a diagram showing a function configuration of the image generation apparatus.

Next, a third embodiment is explained. FIG. 14 is a diagram showing the function configuration of an image generation apparatus 1400 according to the present embodiment. As shown in FIG. 14, in addition to the functions of the image generation apparatus 100, the image generation apparatus 1400 further comprises a failure information acquisition unit 1401. The failure information acquisition unit 1401 communicates with the camera connected to the image generation apparatus 1400, acquires failure information on the camera by an input from a user, and so on. In the present embodiment, it is assumed that the image generation apparatus 1400 is used in place of the image generation apparatus 100 shown in FIG. 8 and the other configuration is the same.

Figure 15:
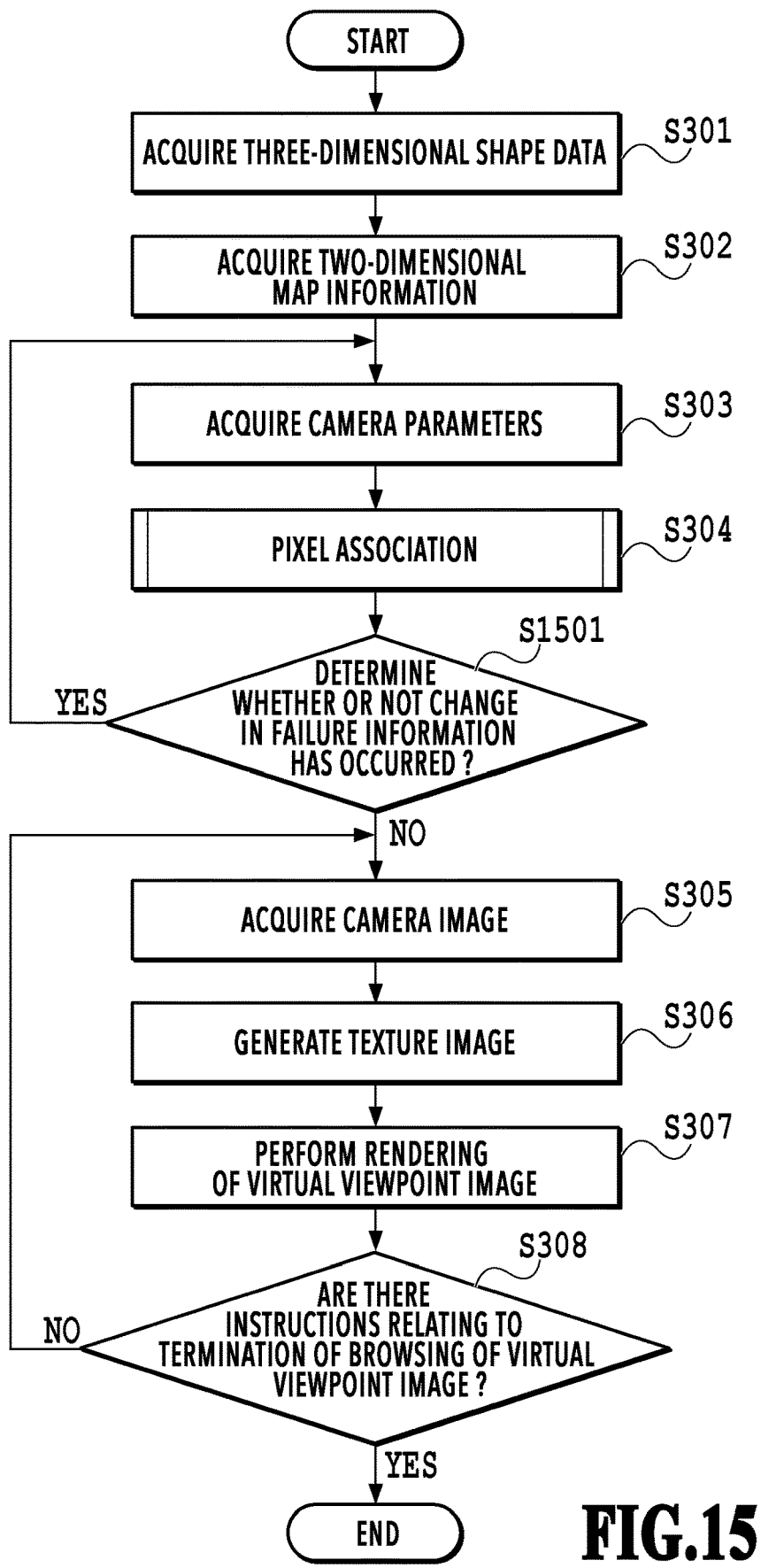
FIG. 15 is a flowchart showing a procedure of generation processing of a virtual viewpoint image in the image generation apparatus.

Next, by using a flowchart in FIG. 15, a procedure of generation processing of a virtual viewpoint image in the image generation apparatus 1400 according to the present embodiment is explained. In FIG. 15, each piece of processing at S301 to S308 is the same as the processing shown in FIG. 3. At S1501, the failure information acquisition unit 1401 determines whether or not a change in failure information has occurred by failure information transmitted from the camera, failure information input by a user, and the like. That is, the failure information acquisition unit 1401 also function as an example of a failure determination unit.

Upon acquisition of information indicating that a failure has occurred in, for example, the camera 801, the failure information acquisition unit 1401 notifies the pixel association unit 115 of the information indicating that a failure has occurred in the camera 801. The pixel association unit 115 performs the association between pixels again by excluding the camera notified that a failure has occurred. That is, here, a failure has occurred in the camera 801, and therefore, the association between pixels is performed by using the camera 802 to the camera 804.

In the flowchart in FIG. 15, it may also be possible to assume that there is no change in failure information at the time of the first execution. Further, the failure information acquisition unit 1401 transmits the failure information on the camera to the pixel association unit 115, but the present embodiment is not necessarily limited to this. For example, it may also be possible to notify the texture image generation unit 116 of the failure information on the camera and for the texture image generation unit 116 to calculate the weight using the camera images except for the camera image captured by the camera determined that a failure has occurred and generate the texture image.

Fourth Embodiment

Figure 16:
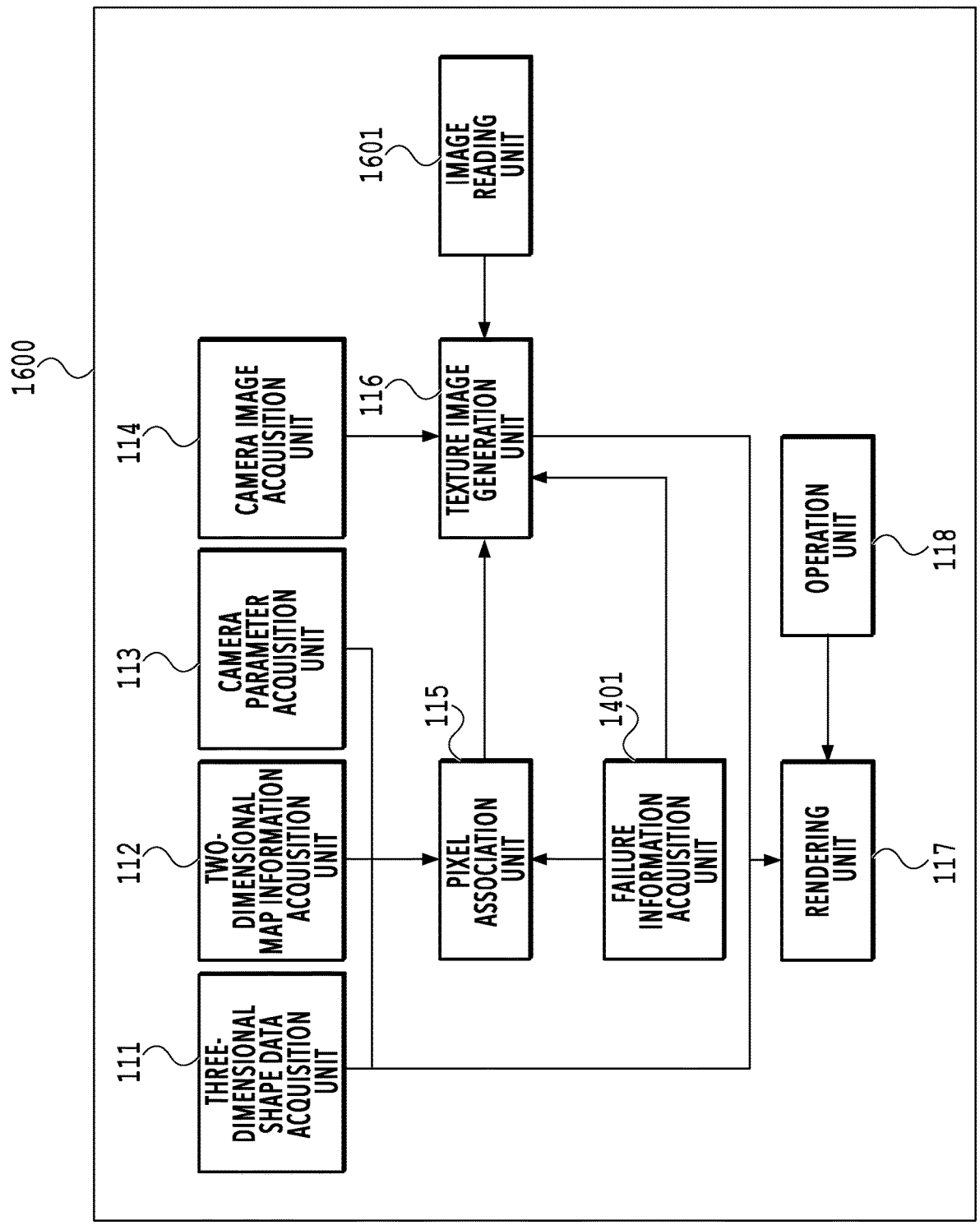
FIG. 16 is a diagram showing a function configuration of the image generation apparatus.

Next, a fourth embodiment is explained. FIG. 16 is a diagram showing the function configuration of an image generation apparatus 1600 according to the present embodiment. As shown in FIG. 16, in addition to the functions of the image generation apparatus 1400, the image generation apparatus 1600 further comprises an image reading unit 1601.

The image reading unit 1601 reads the image data of a texture image or the like from a predetermined file. Here, for example, the image data of the image in which the turf spread all over the field is captured, the image of turf different from the aforementioned image, the image in which the images of turf are tiled and spread all over the image, and the like is read. Alternatively, it may also be possible to read an image as image data, which is created in advance by a user using an image editing application, an image creation application, or the like, for the two-dimensional map information file that is read by the two-dimensional map information acquisition unit 112. Alternatively, in a case where a texture image generated formerly by using three-dimensional shape data and two-dimensional map information, it may also be possible to read the image as image data.

The image data read by the image reading unit 1601 is used at the time of generation of the texture image at S306. More specifically, the texture image generation unit 116 generates the texture image by overwriting the image data read by the image reading unit 1601 and stored in the main storage device 102 with the generated pixel. For example, in a case of the texture image 601, the portion except for the areas indicated by symbol 602, symbol 603, and symbol 604 is the same image as the image of the image data read by the image reading unit 1601. That is, in a case where the image of turf is read, for the area of the field 202, which is not captured by the camera 203, the texture image read for the area except for the area indicated by symbol 602 is used.

In the present embodiment, among the pixels of the image read by the image reading unit 1601, the pixel that is associated with the camera image is overwritten with the pixel on the camera image by the texture image generation unit 116, but the present embodiment is not necessarily limited to this. Consequently, for example, in a case where the pixel of the image read by the image reading unit 1601 is weighted in advance by a user, it may also be possible for the texture image generation unit 116 to perform combination along with the pixel on the camera image by using the weight.

Further, it may also be possible for the image data read by the image reading unit 1601 to be replaced with the texture image generated by the texture image generation unit 116 at any time or at regular intervals. In this case, on a condition that a failure occurs in part of the cameras, updating of the image is stopped for the area captured only by the camera in which the failure has occurred, but it is possible to avoid such a problem that the texture image is no longer generated. Further, as described above, in a case where combination is performed in the state where the pixel of the image of the image data read by the image reading unit 1601 is weighted, it is also possible to update the image while gradually reducing the influence of the camera in which a failure has occurred.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide a technique to associate a texture with three-dimensional shape data with a smaller number of calculation resources.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-058994, filed Mar. 26, 2019, which is hereby incorporated by reference wherein in its entirety.

What is claimed is:

1. An image generation apparatus comprising:
   one or more memories storing instructions; and
   one or more processors executing the instructions to:
   acquire three-dimensional shape data of a background different from a foreground in a captured image;
   acquire a two-dimensional map representing that an element configuring the acquired three-dimensional shape data of the background is associated with an image capturing apparatus;
   acquire a first image based on image capturing at first image capturing timing by the image capturing apparatus and a second image based on image capturing at second image capturing timing by the image capturing apparatus;
   generate a first color information on an element configuring the acquired three-dimensional shape data of the background based on the acquired two-dimensional map and the acquired first image; and
   generate a second color information representing a color allocated to the element configuring the three-dimensional shape data of the background based on the acquired two-dimensional map used for generation of the first color information and the acquired second image.

2. The image generation apparatus according to claim 1, wherein
   the one or more processors further execute the instructions to:
   acquire parameters of the image capturing apparatus,
   the first color information is generated based on the two-dimensional map, the first image, and the acquired parameters of the image capturing apparatus, and
   the second color information is generated based on the two-dimensional map used for generation of the first color information, the second image, and the parameters of the image capturing apparatus.

3. The image generation apparatus according to claim 1, wherein
   the one or more processors further execute the instructions
   to set weight of a pixel on the first image, which corresponds to the first color information, and
   the first color information is generated by combining a product of the pixel on the first image and the set weight.

4. The image generation apparatus according to claim 3, wherein
   the weight is set in accordance with a resolution of the pixel on the first image, which corresponds to the first color information.

5. The image generation apparatus according to claim 4, wherein the one or more processors further execute the instructions to determine whether a failure has occurred in one of the image capturing apparatuses, and
   the first color information is generated by using an image of another image capturing apparatus without using the first image of the image capturing apparatus for which it is determined that a failure has occurred.

6. The image generation apparatus according to claim 5, wherein
   the weight is set, in a case where it is determined that a failure has occurred in one of the image capturing apparatuses after weighting the pixel on the first image with a first weight, the pixel on the first image again with a second weight after excluding the image capturing apparatus for which it is determined that a failure has occurred and
   the first color information is generated by using the second weight.

7. The image generation apparatus according to claim 3, wherein
   the weight is set in accordance with a distance of the pixel on the first image, which corresponds to the first color information, from a center of the first image.

8. The image generation apparatus according to claim 3, wherein
   the weight is set in accordance with a kind of the image capturing apparatus.

9. The image generation apparatus according to claim 3, wherein
   the is set in accordance with a normal vector of a plane of the three-dimensional shape data, which corresponds to the first color information, and a vector representing an orientation of the image capturing apparatus.

10. The image generation apparatus according to claim 3, wherein
    the weight is set in accordance with a distance between the image capturing apparatus and an object.

11. The image generation apparatus according to claim 3, wherein
    the one or more processors further execute the instructions to set a priority level in accordance with a magnitude of the weight set to a pixel on the first image to be used at a time of generation of the first color information, and
    the first color information is generated by using at least one or more of the pixels whose priority level is high on the first color information in accordance with the priority level.

12. An image generation method comprising:
    acquiring three-dimensional shape data of a background different from a foreground in a captured image;
    acquiring a two-dimensional map representing that an element configuring the acquired three-dimensional shape data of the background is associated with an image capturing apparatus;
    acquiring a first image based on image capturing at first image capturing timing by the image capturing apparatus and a second image based on image capturing at second image capturing timing by the image capturing apparatus;
    generating a first color information on an element configuring the acquired three-dimensional shape data of the background based on the acquired two-dimensional map and the acquired first image; and
    generating a second color information representing a color allocated to the element configuring the acquired three-dimensional shape data of the background based on the acquired two-dimensional map used for generation of the first color information and the acquired second image.

13. A non-transitory computer readable storage medium storing a program for causing a computer to execute an image generation method, wherein the image generation method comprising:
  acquiring three-dimensional shape data of a background different from a foreground in a captured image;
  acquiring a two-dimensional map representing that an element configuring the acquired three-dimensional shape data of the background is associated with an image capturing apparatus;
  acquiring a first image based on image capturing at first image capturing timing by the image capturing apparatus and a second image based on image capturing at second image capturing timing by the image capturing apparatus;
  generating a first color information on an element configuring the acquired three-dimensional shape data of the background based on the acquired two-dimensional map and the acquired first image; and
  generating a second color information representing a color allocated to the element configuring the acquired three-dimensional shape data of the background based on the acquired two-dimensional map image used for generation of the first color information and the acquired second image.

* * * * *